United States Patent [19]
Mazelsky

[11] Patent Number: 5,512,348
[45] Date of Patent: Apr. 30, 1996

[54] ARMOR WITH BREAKAWAY SEWING

[75] Inventor: Bernard Mazelsky, West Covina, Calif.

[73] Assignee: ARA, Inc., City of Industry, Calif.

[21] Appl. No.: 232,599

[22] Filed: Apr. 25, 1994

Related U.S. Application Data

[63] Continuation of Ser. No. 869,753, Apr. 20, 1992, abandoned, which is a continuation of Ser. No. 629,056, Dec. 14, 1990, abandoned, which is a continuation of Ser. No. 236,662, Aug. 25, 1988, abandoned.

[51] Int. Cl.[6] .............................. F41H 1/02; B32B 3/06; B32B 7/00
[52] U.S. Cl. ..................... 428/102; 2/2; 2/2.5; 428/229; 428/252; 428/902; 428/911
[58] Field of Search .................. 428/911, 902, 428/284, 286, 282, 102, 229, 252; 112/402, 420; 182/3; 2/2, 2.5

[56] References Cited

U.S. PATENT DOCUMENTS

| | | | |
|---|---|---|---|
| 3,256,130 | 8/1961 | Nisbet et al. | 428/911 |
| 3,841,954 | 10/1974 | Lawler | 428/911 |
| 4,316,404 | 2/1982 | Medlin | 428/911 |
| 4,522,871 | 6/1985 | Armellio, Jr. et al. | 428/911 |
| 4,550,045 | 10/1985 | Hutson | 428/902 |
| 4,608,717 | 9/1986 | Dunbavand | 428/911 |
| 4,697,285 | 10/1987 | Sylvester | 2/2.5 |

*Primary Examiner*—James D. Withers
*Attorney, Agent, or Firm*—Boniard I. Brown

[57] ABSTRACT

Armor is constructed by sewing together a multiplicity of plies of energy absorbing cloth made of polyaramid fibers with stitching thread of relatively lower tensile strength in a pattern such that, upon impact by a projectile, the stitching threads break at multiple locations in response to stresses from fibers stretched by the impact. The armor can be sewn together to form a blanket or vest garments, etc., for protection of persons from projectiles.

6 Claims, 2 Drawing Sheets

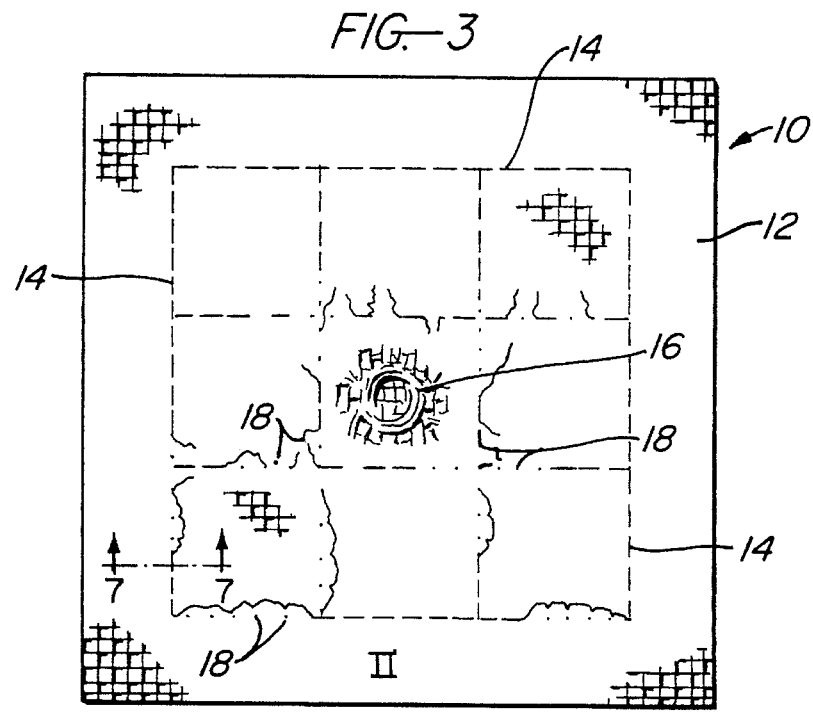
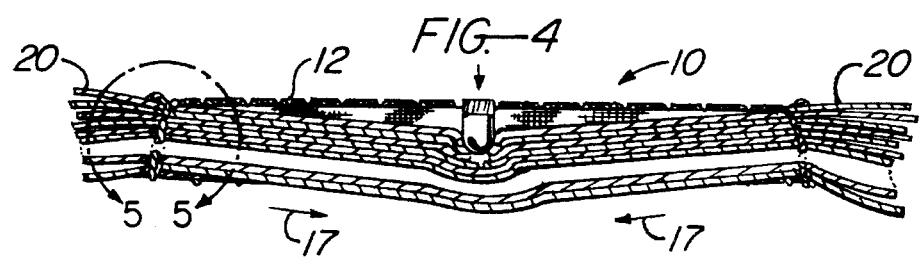
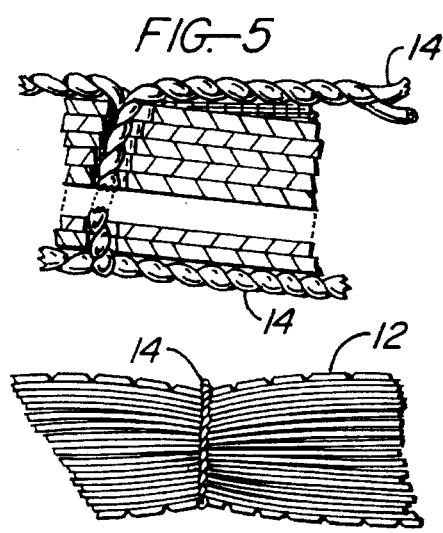
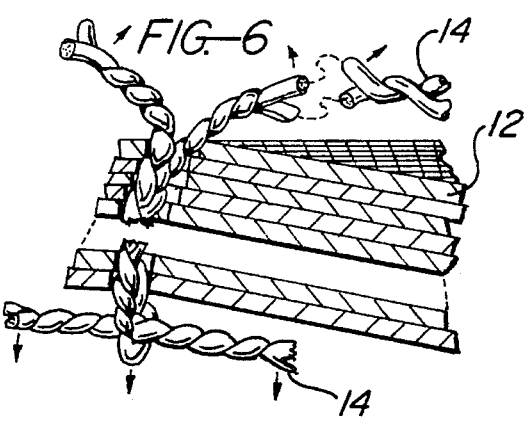

ARMOR WITH BREAKAWAY SEWING

REFERENCE TO RELATED PATENT APPLICATION

This is a continuation of application Ser. No. 07/869,753 filed on Apr. 20, 1992, now abandoned, which is a continuation of application Ser. No. 07/629,056, filed Dec. 14, 1990, now abandoned, which was a continuation of an earlier application, Ser. No. 07/236,662, filed on Aug. 25, 1988, now abandoned.

BACKGROUND OF THE INVENTION

1. Field of the Invention

This invention relates to armor comprising layers of energy absorbing fabric sewn together with thread which breaks at multiple locations when the armor is struck by a projectile. More particularly, the invention relates to armor made of polyaramid fibers woven into multiple plies of cloth which are sewn together with relatively weak nylon thread, said thread forming multiple break-away stitching extending in pattered array over the armor surfaces.

2. Brief Description of the Prior Art

The use of polyaramid fibers for personal armor is well known. To shape the armor into a garment, fabric of woven polyaramid fibers is cut into panels, and the fabric panels are sewn together to form the garment. Thread, including nylon thread, has been used to stitch together the fabric panels. The nylon thread being used to form connections between fabric panels was relatively strong in order to withstand stresses thereon encountered when the person wearing the armor moved his arms and/or torso during normal physical activities. There is no suggestion in the prior art that relatively weak nylon thread has been employed to provide breakaway stitches in a patterned arrangement on fabric panels in a body armor garment.

Armor is sometimes designated as "soft armor" when it is in the form of a vest for protection against low-energy threats such as bullets from hand guns. The fabric in such soft armor configurations, especially KEVLAR® fabric (registered trademark of Du Pont Company) was often treated with chemicals to make it water-resistant. This was necessary to prevent deterioration of performance when the vest or other soft armor became wetted.

Problems have existed in the use of such armor in defeating higher energy threats. To defeat such threats, it was necessary to increase the number of plies of polyaramid cloth. This lead to the problem of excessively heavy or bulky vests, which restricted the actions of the wearer, or made the wearer hot or tired, or both. Thus, there still has been a need for an armor system using layers of fabric, wherein weight and bulk could be reduced by using fewer layers of fabric.

U.S. Pat. No. 4,522,871 to Armellino, et al., discloses a ballistic fabric comprising a multiplicity of fabric plies formed of woven aramid fibers. Criss-crossed rows of stitches are sewn through the fabric plies in a square pattern, as shown in FIG. 1 of the patent drawing. The stitching thread used is preferably the same aramid fiber used in weaving the cloth plies. At column 4, line 35 of this patent, it is stated that the stitching is for the purpose of improving ballistic performance of the multi-ply fabric, particularly against projectiles fired obliquely against the fabric surface. Apparently, the stitching holds the fabric plies relatively close together, with minimal spacing between adjacent plies, whereby the obliquely moving projectile is less able to pick its way through the fabric plies.

The apparent objective of the criss-crossed stitching in the arrangement of Pat. No. 4,522,871 is permanently to connect the various fabric plies together, thus to maintain minimum spacing of the plies at all points along the fabric areas.

OBJECTS AND SUMMARY OF THE INVENTION

An object of the present invention is to provide an armor wherein higher energy threats can be defeated by the armor, while still maintaining a relatively thin, light-weight garment for wearer comfort.

Another object of the invention is to provide an armor with a simple weave and large fiber size (denier) to provide most efficient use of fabric material.

The invention provides armor comprising multiple plies of energy absorbing cloth made of polyaramid fibers, and sewn together with relatively weak thread in a configuration such that, upon impact by a projectile, said threads break at multiple locations.

BRIEF DESCRIPTION OF THE DRAWINGS

FIG. 3 is a rear elevational view of the fabric panel of FIG. 2;

FIG. 4 is a transverse sectional view taken at line 4—4 through the FIG. 2 fabric panel, showing a projectile impacting the panel front surface;

FIG. 5 is an enlarged sectional view of structural detail of the FIG. 4 fabric panel prior to breakage of the stitching threads; and FIG. 6 is a view similar to that of FIG. 5, but showing the stitched threads in a broken condition.

FIG. 7 is a fragmentary sectional view, similar to that of FIG. 5, showing a fabric panel having twenty-three layers with a stitch thread.

DESCRIPTION OF THE PREFERRED EMBODIMENTS

Ballistic energy absorbing fabric panels may be made of various fibers. Two of the most popular materials are polyaramid and polyethylene fibers. Du Pont polyaramid fibers are sold under the name KEVLAR®. The fabric itself can be of various weaves and deniers. Although a basket weave has been developed for ballistic energy absorbing purposes, a plain weave has been found to be useful when utilized in accordance with the present invention. Specifically, a weave with ten ends and picks per inch, using 3,000 denier fibers, has been found to provide a multi-ply fabric panel having superior performance at a lower cost. An alternate multi-ply fabric panel uses a fabric material having a 1,000 denier fiber with ten ends and picks per inch in a standard weave. Fabric woven from Du Pont KEVLAR® 29 in a 10×10 weave, at 3,000 denier, weighs 8.1 ozs. per square yard.

To make a multi-ply garment from energy absorbing fabric such as KEVLAR®, it is necessary to sew the multiplicity of plies together to form individual panels, e.g., front, back, sleeve panels, etc. Size 3 and size E sewing thread (both according to MIL SPEC V-T-295 Type II) have been used to sew the fabric plies together. With the desired multiple breaks of the thread after impact by a projectile, size E thread has been found to give superior performance because it breaks more easily. Further reductions in breaking strength of the thread can also be used, as necessary to defeat other projectiles such as the flechette.

Size 3 thread under military specification, Mil Spec V-T-295 dated Aug. 1, 1985, is 1 ply nylon thread having a breaking force of twenty-seven pounds and a maximum elongation of thirty-five percent. Size E thread, under this same military specification, is 1 ply nylon thread having a breaking force of nine pounds and a maximum elongation of thirty-five percent.

Ballistic energy-absorbing fabric may be purchased from either the manufacturer of the fibers or the weaver, with water-repellant treatment already in place. Most absorbent retardant substances are water-repellant treatment chemicals. However, the fabric after weaving may also be treated with water-repellant by the armor maker. Du Pont, the maker of KEVLAR®, will supply fabric with ZEPEL® D (a registered trademark of Du Pont Company for a fluoraliphatic compound) treatment to an armor manufacturer. However, independent application of the absorbent retardant substances by the armor maker, using either an aerosol or bath application technique, is also feasible. Each fabric layer can be sprayed with aerosol cans or other similar spray apparatus to apply the water-proofing compounds. Typically, the absorbent retardant chemical applied by spray techniques is a siliconate, specifically a sodium siliconate.

Figure 1:
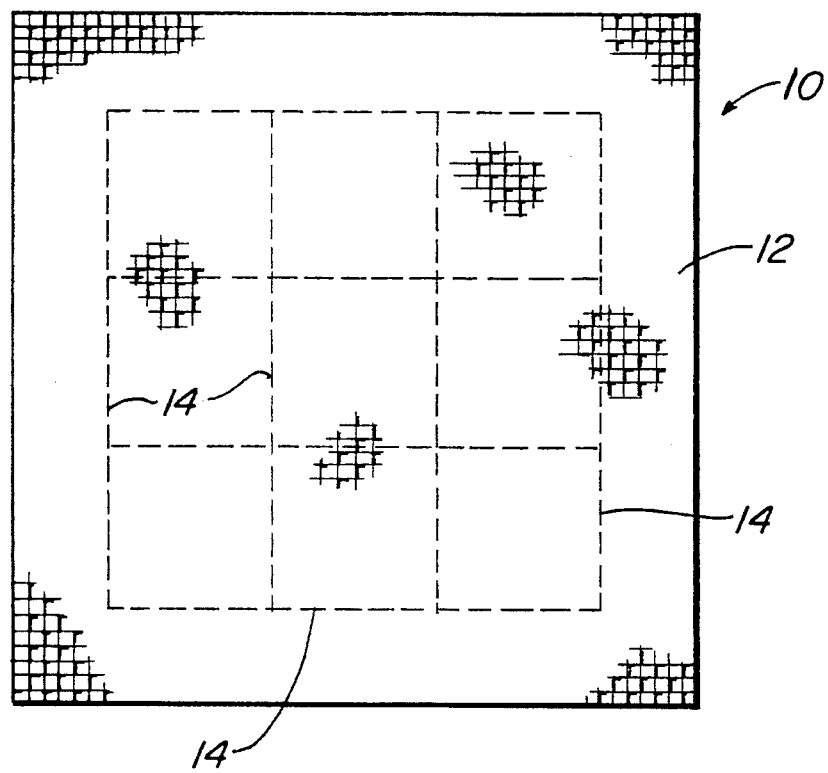
FIG. 1 is a front elevation of an armor fabric panel to be tested with a stitching pattern consisting of contiguous squares according to the invention.

Referring to the drawings, FIG. 1 shows a front view of a multi-ply armor fabric panel 10 which consists of a front ply 12 of ballistic energy absorbing fabric sewn by thread 14, together with numerous backing plies as shown in FIGS. 4, 5 and 6. The ballistic energy absorbing fabric may preferably be polyaramid fibers woven in a plain pattern. FIG. 1 shows an armor fabric panel having a series of stitches 14 which form nine contiguous defined areas or squares in a central portion of the panel. This stitching pattern should not be considered to be representative or limiting as to the types of stitching patterns which would be used in constructing actual armor garments or blankets to be worn or used by persons to defeat handguns, fragmentary projectiles, or other threats.

The stitching pattern may be a series of straight stitches 14 criss-crossed to form or define areas or squares three inches by three inches. The panel shown in FIG. 1 would be twelve inches by twelve inches, with nine squares stitched into the panel, leaving the perimeter zone as a border for attachment of the panel to a frame (not shown). The frame may be used to support the fabric panel during test firing of a ballistic projectile into or through the panel.

FIGS. 4, 5 and 6 show the plurality of fabric plies 12 stitched together by the breakaway thread 14. Each stitch extends completely through all of the plies to form common anchorage points or lines. In the development of the invention, different stitch sizes (spacings) were used, namely four to five stitches per inch, six to seven stitches per inch, and seven to eight stitches per inch. The stitching thread was size 3, having a breaking strength of 27 pounds, or size E having a breaking strength of 9 pounds. It will be seen that the stitching thread has such predetermined low breaking strength in relation to the polyaramid fiber breaking strength that the stitching thread breaks when stretched by the polyaramid fibers which are stretched between an impacting projectile and the stitch threads anchorages. The multiplicity of plies may vary in number and preferably may be at least fifteen. Twenty-three plies (FIG. 7) or twenty-eight plies have proved effective.

Various test firings were performed on the type of multi-ply fabric panel depicted in FIGS. 1 through 6. To test for a high energy threat, a .50 caliber 207 grain fragment simulating projectile (FSP) was shot at the targets at approximately 1,500 feet per second (or varying velocities near 1,500 feet per second). Other characteristics of fragment simulating projectiles are described in standard MIL-P-46593A (MU). The projectile is fired from an appropriate size gun barrel using an individually weighed gunpowder charge in a cartridge. The amount and type of gunpowder used to obtain a certain projectile velocity are calculated according to methods well known to those skilled in the ballistic testing art. The velocity of the projectile is measured by measuring travel time between two photocells a known distance apart, which is accurate within plus or minus 0.1%. The arrangement of the measuring equipment and methods used to calculate the velocity are again well known to those skilled in the ballistic testing art.

The armor fabric panel was held in a ballistic frame which is standard throughout the test period. The frame can accommodate various thicknesses of armor panels. However, all armor panels tested in the development of the present invention were 12" wide by 12" high, i.e., one square foot. The frame is sturdy enough to present the armor piece to the incoming projectile in such manner that the armor piece is not allowed to fold in upon itself or otherwise become detached from the frame. The armor piece test was declared successful when the projectile only partially penetrated (PP) the armor piece. However, when the projectile emerges from the other side of the armor piece, the test was declared a complete penetration (CP) and, hence, a failure.

The stitching pattern of defined areas used in the test was arbitrarily chosen to be contiguous squares 3"×3" in size. For the 12"×12" test armor pieces used in Example I, there were nine squares sewn into the center area of the pieces, with the remaining armor piece area serving as a border. All stitching was done according to military specification FED-STD-751 producing Type 301 stitches.

Figure 2:
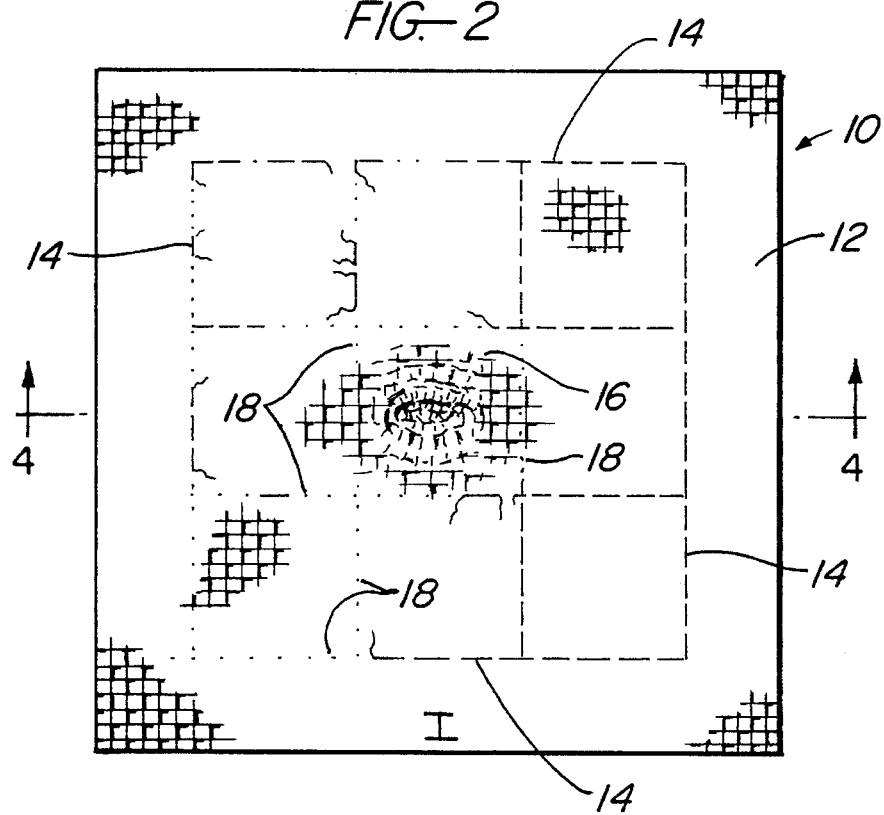
FIG. 2 is a front elevation of the FIG. 1 armor panel after a projectile has been fired into it, causing breaks at multiple locations in the stitching threads.

Referring to FIG. 2, a fragment simulating projectile was fired into area 16 of the armor 10. The appearance of the fiber breaking in area 16 is exaggerated for illustration purposes. The impact of the projectile and consequent energy dissipation caused the breaks 18 in the thread 14 used to stitch the armor together. The number and extent of the breaks shown in FIG. 2 have been chosen for illustrative purposes only.

FIG. 3 shows a reverse or rear view of the FIG. 2 test panel. The stitched threads 14 break either at the front or the rear of the panel.

The theory of using breakaway, relatively weak threads for stitches 14 is that when the threads 14 break, the area of the fabric plies subjected to the projectile force is automatically increased beyond the initial three inch by three inch square zone impacted by the projectile. As depicted in FIG. 4, when the projectile impacts the multi-ply fabric the fabric threads are placed in tension. Stitches 14 act as anchorage points, whereby the polyaramid fibers are pulled and stretched toward the projectile impact point. Elongation of the polyaramid fibers in the directions of the arrows 17 (FIG. 4) absorbs some of the projectile energy. The polyaramid fibers in each fabric ply act relatively independently, whereby each fabric ply absorbs some of the projectile energy by the fiber elongation action.

The fabric plies exert a pulling force on the anchoring threads 14, thereby stretching and breaking such threads, usually at multiple points. Breakage of the threads 14 absorbs some of the projectile energy. As the threads break, a greater area of the fabric panel is exposed to the projectile force and energy. As seen in FIG. 4, when stitches 14 break, the fabric plies in the adjacent defined areas or zones 20 are subjected to the projectile force. The affected length of each polyaramid fiber in each ply is increased so that each polyaramid fiber is thus able to absorb more projectile energy before rupture. The projectile force is spread from the impacted defined area or cloth square across the stitch threads 14 and into the adjacent cloth squares. By thus exposing a greater polyaramid fiber length to the impact load, each individual fiber undergoes a greater total elongation, thus enabling the fiber to absorb more impact energy and better preserve the fabric panel against complete penetration by the projectile.

The operation and action of the armor of the invention differs from the action in the panel of the aforementioned U.S. Pat. No. 4,522,871. In that panel, the thread used for stitching the fabric plies together is preferably the same material as that used in weaving the ballistic cloth (column 2, line 53 of the patent). The high strength stitching acts as a fixed perimeter anchorage for the fabric square impacted by the projectile. The polyaramid thread area stressed by the projectile is only the area contained within the affected square. When the polyaramid threads of the affected square have elongated by a predetermined percentage, they rupture, thus no longer absorbing the projectile energy or force.

In the panel of this patent, the energy absorption action is confined essentially to the fabric square impacted by the projectile, whereas in the proposed fabric panel construction of the present invention the energy-absorption action is spread beyond the impacted defined area or square into other contiguous areas of the panel, because of the use of relatively weak breakaway threads for stitching 14.

The present invention was developed primarily as armor protection against 50 caliber fragmentary small arms fire. The most economical armor panel for providing the necessary protection proved to be a fabric panel containing approximately twenty-eight plies of polyaramid plain weave cloth, 3000 denier, stitched together with size E thread with a stitch spacing of four to five threads per inch. The fabric panel had a thickness of about 0.40 inch and an area density of about 1.63 pounds per square foot. The panel provided protection up to a projectile velocity of approximately 1,490 feet per second. Panels formed of polyaramid cloth fibers of 1000 denier weight (size) were effective. However, the cost of the 1000 denier material is greater than the cost of the 3000 denier material. Hence, the 3000 denier material is preferred.

Thus there has been shown and described a novel armor with breakaway stitching which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

The inventor claims:

1. Flexible body armor comprising:

a multiplicity of about 23 to 28 plies of an energy-absorbing cloth woven of about 1000 to 3000 denier polyaramid fibers, and stitch threads extending through and sewing together the multiplicity of plies in a grid pattern to define common anchorages, whereby upon impact by a projectile, the polyaramid fibers of the plies are stretched between the projectile and stitch threads anchorages, the stitch threads being formed of a size E nylon having such predetermined low breaking strength in relation to the tensile strength of said polyaramid fibers that the stitch threads break at multiple locations upon being stretched by action of the polyaramid fibers being stretched between the impacting projectile and stitch threads anchorages of said grid pattern, whereby said stitch threads and said polyaramid fibers absorb substantial ballistic impact energy in response to ballistic impact stresses imposed thereon.

2. Flexible body armor comprising:

a multiplicity of about 23 to 28 plies of an energy-absorbing cloth woven of about 1000 to 3000 denier polyaramid fibers, and stitch threads extending through and sewing together the multiplicity of plies in a grid pattern to define common anchorages, said multiplicity of plies being sewn together by the stitch threads in a pattern of contiguous defined areas of rectilinear configurations, whereby upon impact by a projectile, the polyaramid fibers of the plies are stretched between the projectile and stitch threads anchorages, the stitch threads being formed of a size E nylon having such predetermined low breaking strength in relation to the tensile strength of said polyaramid fibers that the stitch threads break at multiple locations upon being stretched by action of the polyaramid fibers being stretched between the impacting projectile and stitch threads anchorages of said grid pattern, whereby said stitch threads and said polyaramid fibers absorb substantial ballistic impact energy in response to ballistic impact stresses imposed thereon.

3. Flexible body armor comprising:

a multiplicity of about 23 to 28 plies of an energy-absorbing cloth woven of about 3000 denier polyaramid fibers, and stitch threads extending through and sewing together the multiplicity of plies in a grid pattern to define common anchorages, whereby upon impact by a projectile, the polyaramid fibers of the plies are stretched between the projectile and stitch threads anchorages, said stitch threads pattern comprising a plurality of contiguous areas defined by the stitch threads, and upon impact of the projectile in one of said defined contiguous areas of the pattern, and the breaking of the stitch threads defining said one defined area, polyamarid fibers in contiguous defined areas are stretched and elongated to absorb additional impact energy, the stitch threads being formed of size E nylon having such predetermined low breaking strength in relation to the tensile strength of said polyaramid fibers that the stitch threads break at multiple locations upon being stretched by action of the polyaramid fibers being stretched between the impacting projectile and stitch threads anchorages of said grid pattern, whereby said stitch threads and said polyaramid fibers absorb substantial ballistic impact energy in response to ballistic impact stresses imposed thereon.

4. Flexible body armor comprising:

a multiplicity of about 23 to 28 plies of an energy-absorbing cloth woven of 3000 denier polyaramid fibers, and stitch threads extending through and sewing together the multiplicity of plies in a grid pattern to define common anchorages, said multiplicity of plies being sewn together by the stitch threads in a pattern of contiguous defined areas of rectilinear configurations, whereby upon impact by a projectile, the polyaramid fibers of the plies are stretched between the projectile and stitch threads anchorages, the stitch threads being formed of size E nylon having such predetermined low breaking strength in relation to the tensile strength of said polyaramid fibers that the stitch threads break at multiple locations upon being stretched by action of the polyaramid fibers being stretched between the impacting projectile and stitch threads anchorages of said grid pattern, whereby said stitch threads and said polyaramid fibers absorb substantial ballistic impact energy in response to ballistic impact stresses imposed thereon.

5. Flexible body armor comprising:

a multiplicity of at least 15 plies of an energy-absorbing cloth woven of about 1000 to 3000 denier polyaramid fibers, and stitch threads extending through and sewing together the multiplicity of plies in a grid pattern to define common anchorages, whereby upon impact by a projectile, the polyaramid fibers of the plies are stretched between the projectile and stitch threads anchorages, the stitch threads are size E with breaking strength of about 9 pounds such that the stitch threads break at multiple locations upon being stretched by action of the polyaramid fibers being stretched between the impacting projectile and stitch threads anchorages of said grid pattern, whereby said stitch threads and said polyaramid fibers absorb substantial ballistic impact energy in response to ballistic impact stresses imposed thereon.

6. Flexible body armor comprising:

a multiplicity of plies of an energy-absorbing cloth woven of about 1000 to 3000 denier polyaramid fibers, and stitch threads extending through and sewing together the multiplicity of plies in a grid pattern to define common anchorages, whereby upon impact by a projectile, the polyaramid fibers of the plies are stretched between the projectile and stitch threads anchorages, the stitch threads are size E with breaking strength of about 9 pounds such that the stitch threads break at multiple locations upon being stretched by action of the polyaramid fibers being stretched between the impacting projectile and stitch threads anchorages of said grid pattern, whereby said stitch threads and said polyamarid fibers absorb substantial ballistic impact energy in response to ballistic impact stresses imposed thereon.

* * * * *